(12) United States Patent
Fellenstein et al.

(10) Patent No.: US 7,656,312 B2
(45) Date of Patent: Feb. 2, 2010

(54) METHOD AND SYSTEM FOR RETRIEVING AND BROADCASTING UPDATED INFORMATIONAL DATA BASED ON LOCATION

(75) Inventors: Craig William Fellenstein, Brookfield, CT (US); Steven Van Jackson, Yardley, PA (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 11/849,446

(22) Filed: Sep. 4, 2007

(65) Prior Publication Data

US 2009/0058650 A1     Mar. 5, 2009

(51) Int. Cl.
*G08G 1/123* (2006.01)
(52) U.S. Cl. .................. 340/995.24; 340/988; 340/990; 340/995.1; 340/995.12
(58) Field of Classification Search .................. 340/988, 340/990, 995.1, 995.12, 995.24
See application file for complete search history.

(56) References Cited

U.S. PATENT DOCUMENTS

| | | | |
|---|---|---|---|
| 5,806,018 A | * | 9/1998 | Smith et al. ............... 701/211 |
| 6,199,045 B1 | | 3/2001 | Giniger et al. |
| 6,205,399 B1 | | 3/2001 | Ogino et al. |
| 6,329,908 B1 | | 12/2001 | Frecska |
| 6,385,533 B1 | | 5/2002 | Halt et al. |
| 6,801,779 B1 | | 10/2004 | Liebenow |
| 6,845,338 B1 | | 1/2005 | Willins et al. |

\* cited by examiner

*Primary Examiner*—Travis R Hunnings
(74) *Attorney, Agent, or Firm*—Schmeiser, Olsen & Watts; William E. Schiesser

(57) ABSTRACT

A tracking method and system. The method comprises receiving by a tracking apparatus, data comprising informational data segments and associated tracking data segments. The tracking apparatus is moved within a specified proximity of a first location. The tracking apparatus senses the first location. The tracking apparatus retrieves a first informational data segment associated with the first location based on a first tracking data segment. The tracking apparatus requests an updated informational data segment associated with the first informational data segment, the first tracking data segment, and the first location. The tracking apparatus retrieves the updated informational data segment. The tracking apparatus broadcasts a specified portion of the updated informational data segment. The specified portion is dependent on a specified condition of the tracking apparatus.

48 Claims, 7 Drawing Sheets

METHOD AND SYSTEM FOR RETRIEVING AND BROADCASTING UPDATED INFORMATIONAL DATA BASED ON LOCATION

FIELD OF THE INVENTION

The present invention relates to a method and associated system for retrieving and broadcasting informational data based on a location.

BACKGROUND OF THE INVENTION

Assigning up to date data files to associated objects so that the objects are appropriately described is typically unreliable. When users view the objects, accurate descriptions for the objects are preferable in order to accurately describe the objects for the users. Typically, accurate descriptions for the objects are not available. Accordingly, there exists a need in the art to overcome the deficiencies and limitations described herein above.

SUMMARY OF THE INVENTION

The present invention provides a method, comprising:

receiving, by a tracking apparatus, data, said data comprising informational data segments and associated tracking data segments, said informational data segments and said associated tracking data segments associated with a plurality of locations, each informational data segment of said informational data segments and each associated tracking data segment of said tracking data segments associated with a different location from said plurality of locations, each said location at a different geographical area, said tracking apparatus comprising a memory device;

storing, said data within said memory device;

sensing, by said tracking apparatus, a first location of said locations, wherein said tracking apparatus is located within a specified proximity of said first location of said locations;

first retrieving, by said tracking apparatus, a first informational data segment of said informational data segments associated with said first location, said first retrieving based on a first tracking data segment of said associated tracking data segments associated with said first informational data segment;

requesting, by said tracking apparatus, an updated informational data segment, said updated informational data segment associated with said first informational data segment, said first tracking data segment, and said first location;

second retrieving, by said tracking apparatus, said updated informational data segment; and broadcasting, by said tracking apparatus, a specified portion of said updated informational data segment, said specified portion of said updated informational data segment dependent on a specified condition of said tracking apparatus.

The present invention provides a tracking apparatus comprising a processor coupled to a computer-readable memory unit, said memory unit comprising data and instructions that when executed by the processor implement a tracking method, said method comprising;

receiving, by said tracking apparatus, data, said data comprising informational data segments and associated tracking data segments, said informational data segments and said associated tracking data segments associated with a plurality of locations, each informational data segment of said informational data segments and each associated tracking data segment of said tracking data segments associated with a different location from said plurality of locations, each said location at a different geographical area, said tracking apparatus comprising a memory device;

storing, said data within said memory unit;

sensing, by said tracking apparatus, a first location of said locations, wherein said tracking apparatus is located within a specified proximity of said first location of said locations;

first retrieving, by said tracking apparatus, a first informational data segment of said informational data segments associated with said first location, said first retrieving based on a first tracking data segment of said associated tracking data segments associated with said first informational data segment;

requesting, by said tracking apparatus, an updated informational data segment, said updated informational data segment associated with said first informational data segment, said first tracking data segment, and said first location;

second retrieving, by said tracking apparatus, said updated informational data segment; and broadcasting, by said tracking apparatus, a specified portion of said updated informational data segment, said specified portion of said updated informational data segment dependent on a specified condition of said tracking apparatus.

The present invention provides a computer program product, comprising a computer usable medium comprising a computer readable program code embodied therein, said computer readable program code comprising an algorithm adapted to implement a tracking method within a tracking apparatus comprising a memory unit, said method comprising:

receiving, by said tracking apparatus, data, said data comprising informational data segments and associated tracking data segments, said informational data segments and said associated tracking data segments associated with a plurality of locations, each informational data segment of said informational data segments and each associated tracking data segment of said tracking data segments associated with a different location from said plurality of locations, each said location at a different geographical area, said tracking apparatus comprising a memory device;

storing, said data within said memory unit;

sensing, by said tracking apparatus, a first location of said locations, wherein said tracking apparatus is located within a specified proximity of said first location of said locations;

sensing, by said tracking apparatus, said first location of said locations;

first retrieving, by said tracking apparatus, a first informational data segment of said informational data segments associated with said first location, said first retrieving based on a first tracking data segment of said associated tracking data segments associated with said first informational data segment;

requesting, by said tracking apparatus, an updated informational data segment, said updated informational data segment associated with said first informational data segment, said first tracking data segment, and said first location;

second retrieving, by said tracking apparatus, said updated informational data segment; and broadcasting, by said tracking apparatus, a specified portion of said updated informational data segment, said specified portion of said updated informational data segment dependent on a specified condition of said tracking apparatus.

The present invention provides a process for integrating computing infrastructure, comprising integrating computer-readable code into a tracking apparatus, wherein the code in combination with the tracking apparatus is capable of performing a tracking method, said method comprising:

receiving, by said tracking apparatus, data, said data comprising informational data segments and associated tracking data segments, said informational data segments and said associated tracking data segments associated with a plurality of locations, each informational data segment of said informational data segments and each associated tracking data segment of said tracking data segments associated with a different location from said plurality of locations, each said location at a different geographical area, said tracking apparatus comprising a memory device;

storing, said data within a memory unit within said tracking apparatus;

sensing, by said tracking apparatus, a first location of said locations, wherein said tracking apparatus is located within a specified proximity of said first location of said locations;

first retrieving, by said tracking apparatus, a first informational data segment of said informational data segments associated with said first location, said first retrieving based on a first tracking data segment of said associated tracking data segments associated with said first informational data segment;

requesting, by said tracking apparatus, an updated informational data segment, said updated informational data segment associated with said first informational data segment, said first tracking data segment, and said first location;

second retrieving, by said tracking apparatus, said updated informational data segment; and broadcasting, by said tracking apparatus, a specified portion of said updated informational data segment, said specified portion of said updated informational data segment dependent on a specified condition of said tracking apparatus.

The present invention advantageously provides method and associated system capable of assigning up to date data files to associated objects.

DETAILED DESCRIPTION OF THE INVENTION

Figure 1:
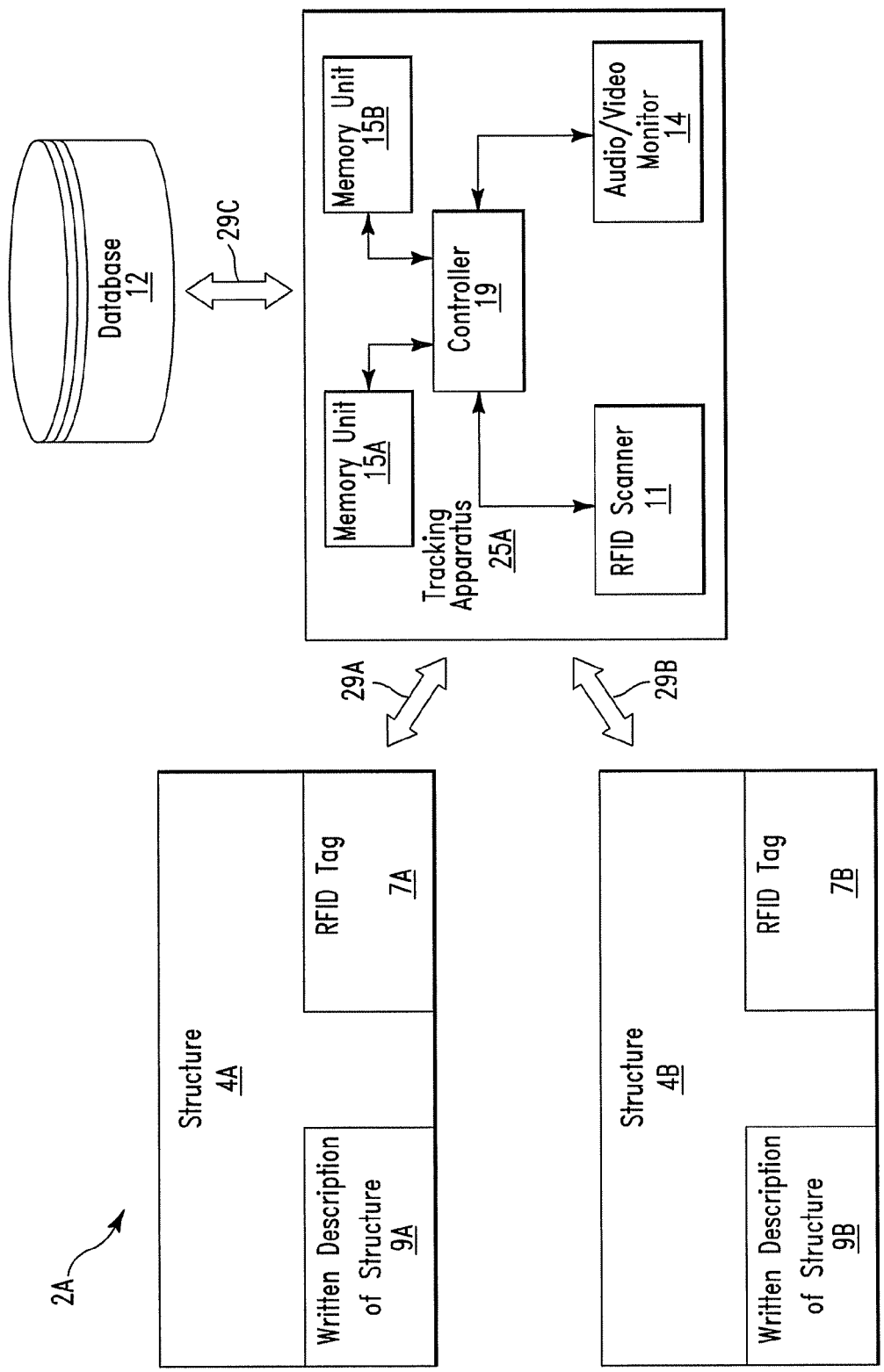
FIG. 1 illustrates a block diagram view of a system comprising a tracking apparatus and structures, in accordance with embodiments of the present invention.

FIG. 1 illustrates a block diagram view of a system 2A comprising a tracking apparatus 25A, database 12, links 25A . . . 25C, and structures 4A and 4B, in accordance with embodiments of the present invention. System A allows a user in possession of tracking apparatus 25A to approach structure 4A and/or 4B and receive a broadcast comprising an associated (i.e., associated to structure 4A and/or 4B) portion of informational data (e.g., audio and/or video data stored in tracking apparatus 25A) describing associated structure 4A and/or 4B. For example, a user touring a museum will carry tracking apparatus 25A and as the user approaches each exhibit (e.g., work of art, sculpture, etc), tracking apparatus 25A will detect each exhibit and broadcast an associated portion of informational data describing the exhibit. The portion of informational data broadcasted for the user may be dependent on a specified distance that the user is from structure 4A and/or 4B. For example, if the user is 5 feet away from the exhibit (e.g., structure 4A), the portion of the informational data broadcasted for the user may comprise a small abbreviated portion of the informational data associated with the exhibit (e.g., structure 4A) as it is assumed that the user is moving away from the structure. In contrast, if the user is 2 feet away from the exhibit (e.g., structure 4A), the portion of informational data broadcasted for the user may comprise an entire portion of the informational data associated with the exhibit (e.g., structure 4A) as it is assumed that the user is moving towards the structure. Alternatively, the portion of informational data broadcasted for the user may be dependent on a specified amount of time that the user is detected at structure 4A and/or 4B. Additionally, system 2A allows a user in possession of tracking apparatus 25A to approach structure 4A and/or 4B and receive a broadcast (e.g., via wireless link 29C) comprising an updated (i.e., current) associated (i.e., associated to structure 4A and/or 4B) portion of informational data (e.g., audio and/or video data in real time from database 12) describing the associated structure 4A and/or 4B.

Structure 4A comprises a radio frequency identification (RFID) tag 7A and optionally a written description 9A of structure 4A. Structure 4B comprises an RFID tag 7B and optionally a written description 9B of structure 4B. Structures 4A and 4B may comprise any type of structures requiring descriptions including, inter alia, exhibits at a museum (e.g., work of art, sculpture, etc), inventory items (e.g., items in a warehouse, military supplies, etc), etc. Tracking apparatus 25A comprises a controller 19, a memory unit 15A, a memory unit 15B, an RFID scanner 11, and an audio/video monitor 14. Note that memory unit 15A and memory unit 15B may be part of a same memory unit or memory unit 15A and memory unit 15B may be individual discrete memory units. Memory unit 15A and memory unit 15B may comprise any type of memory unit (removable or non-removable) including, inter alia, non-volatile random access memory (RAM), flash memory (e.g., a USB jump drive), read only memory (ROM) (e.g., compact disc (CD) ROM, digital versatile disc (DVD) ROM, etc), hard disc drive etc. Controller 19 in combination with any controlling software on memory unit 15A controls all functionality of tracking apparatus 25A. Audio/video monitor 14 may comprise any type of audio and/or video monitor including, inter alia, an amplifier and speakers, a video monitor (liquid crystal (LCD), Plasma, cathode ray tube (CRT), etc), or any combination thereof. Memory unit 15B may comprise informational data (e.g., pre-stored or downloaded in real time) describing each of structures 4A and 4B. Additionally, memory unit 15B comprises identification data describing RFID tags 7A and 7B. The identification data describing RFID tags 7A and 7B may comprise any type of identification data including, inter alia, a serial number for each of RFID tags 7A and 7B. The identification data describing RFID tag 7A is associated with informational data describing structure 4A. The identification data describing RFID tag 7B is associated with informational data describing structure 4B.

When a user enables tracking apparatus 25A, tracking apparatus 25A continuously scans surroundings in order to locate RFID tags. As the user possessing (e.g., carrying) tracking apparatus 25A approaches structure 4A, RFID scanner 11 scans and senses RFID tag 7A (via link 29A) and compares identification data from RFID tag 7A (e.g., a serial number) to stored identification information on memory unit 15B. When a match is located an associated portion of informational data stored on memory unit 15B is broadcast for the user via audio/video monitor 14. Alternatively, tracking apparatus 25A may perform a request to determine if updated (i.e., current) informational data associated with structure 4A is available (e.g., in database 12) instead of or in addition to the informational data stored on memory unit 15B. If updated (i.e., current) informational data associated with structure 4A is located (i.e., available) then tracking apparatus 25A may store and/or broadcast the updated (i.e., current) informational data only or may broadcast a combination of the updated (i.e., current) informational data and the associated portion of informational data stored on memory unit 15B. The updated (i.e., current) informational data or portion of the updated (i.e., current) informational data may be directly transmitted (i.e., in real time) from database 12 via wireless link 29C and broadcast for the user via audio/video monitor 14. Wireless link 29C may comprise any type of wireless link including, inter alia, a satellite link, a radio frequency (RF) link, etc. Wireless link 29C may comprise a high speed network link, a low speed network link, or any combination thereof. A size of the associated portion of informational data and/or portion of the updated (i.e., current) informational data broadcasted for the user is dependent on a specified distance that the user is from structure 4A or a specified time that the user is within range of structure 4A. Specified distances from structure 4A are preprogrammed and associated with informational data associated with structure 4A so that specified portions of the informational data or portion of the updated (i.e., current) informational data may be broadcasted for the user dependent on distances from structure 4A. RFID scanner 11 may determine a distance by a strength of a signal received from RFID tag 7A. Specified time periods that the user is within range of structure 4A may also be preprogrammed and associated with informational data associated with structure 4A. Likewise, as the user possessing (e.g., carrying) tracking apparatus 25A approaches structure 4B, RFID scanner 11 senses RFID tag 7B and compares identification data from RFID tag 7B (e.g., a serial number) to stored identification information on memory unit 15B. When a match is located an associated portion of informational data stored on memory unit 15B is retrieved (via link 29B) broadcast for the user via audio/video monitor 14. Alternatively (as with described with respect to structure 4A), tracking apparatus 25A may perform a request to determine if updated (i.e., current) informational data associated with structure 4B is available (e.g., in database 12) instead of or in addition to the informational data stored on memory unit 15B. If updated (i.e., current) informational data associated with structure 4B is located (i.e., available) then tracking apparatus 25A may store and/or broadcast the updated (i.e., current) informational data only or may broadcast a combination of the updated (i.e., current) informational data and the associated portion of informational data stored on memory unit 15B. A size of the associated portion of informational data and/or portion of the updated (i.e., current) informational data broadcasted for the user is dependent on how far the user is from structure 4B or a specified time that the user is within range of structure 4B. Specified distances from structure 4B are preprogrammed and associated with associated portion of informational data and/or portion of the updated (i.e., current) informational data associated with structure 4B so that specified portions of the informational data may be broadcasted for the user dependent on distances from structure 4B. RFID scanner 11 may determine a distance by a strength of a signal received from RFID tag 7B. Specified time periods that the user is within range of structure 4B may also be preprogrammed and associated with any informational data associated with structure 4B.

An example of implementation for tracking apparatus 25A is described as follows:

In this example an ammunition storage facility has been damaged. Enemy forces are advancing and a soldier (i.e., external to the ammunition storage facility) requiring protective gear and ammunition located in the damaged facility must enter the facility and quickly and locate the required material (i.e., protective gear and ammunition). Tracking apparatus 25A is used to locate the required protective gear and ammunition (i.e., comprising RFID tags), even if the materials have been knocked off the shelves in an explosion.

Figure 2:
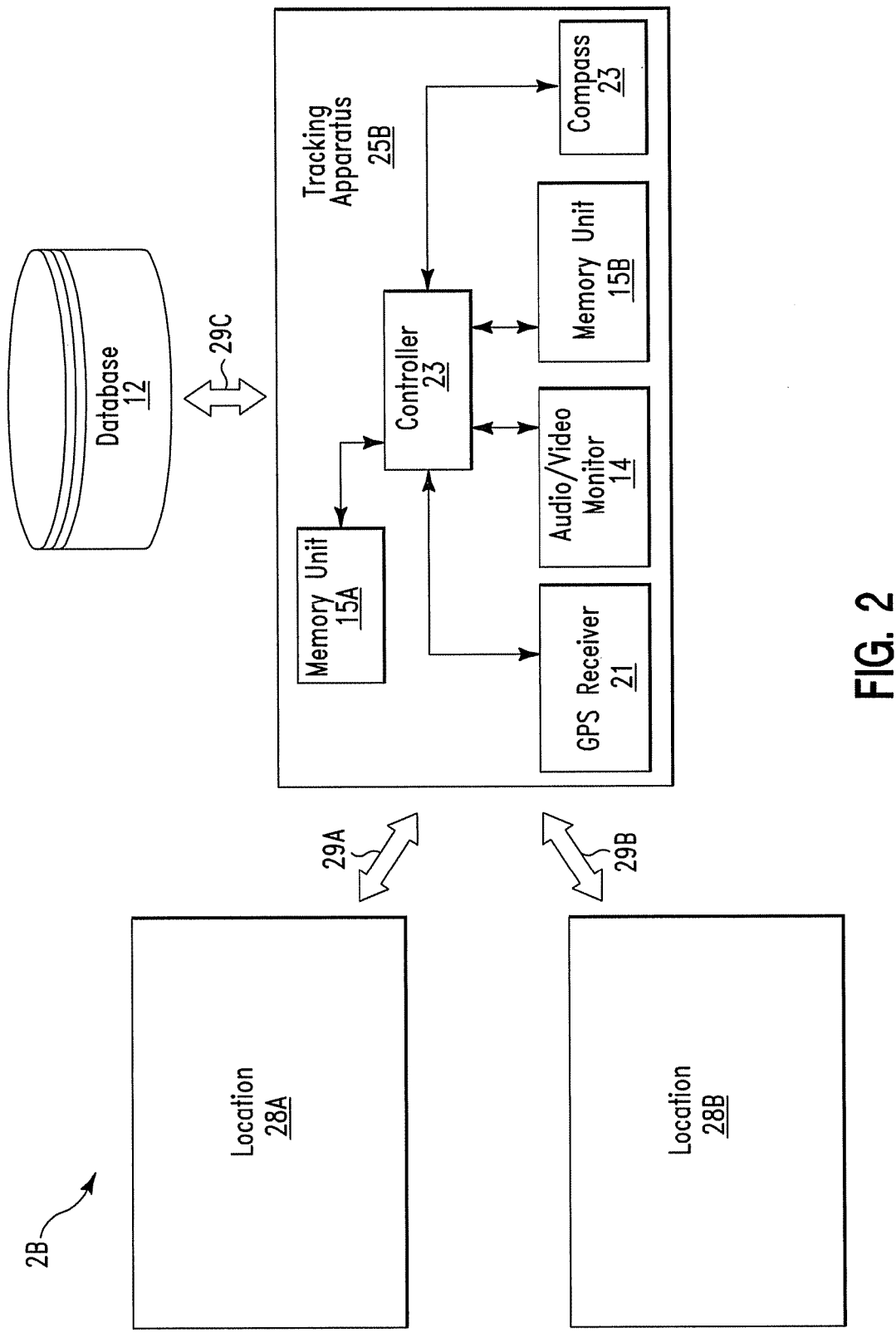
FIG. 2 illustrates a block diagram view of a system comprising a tracking apparatus and locations, in accordance with embodiments of the present invention.

FIG. 2 illustrates a block diagram view of a system 2B comprising a tracking apparatus 25B and locations 28A and 28B, in accordance with embodiments of the present invention. In contrast with tracking apparatus 25A of FIG. 1, a tracking apparatus 25B of FIG. 2 comprises a global positioning satellite (GPS) receiver 21 and a compass 23 instead of RFID scanner 11. Compass 23 may comprise a digital compass. System 2B allows a user in possession of tracking apparatus 25B to approach locations 28A and 28B and receive a broadcast comprising an associated portion of informational data (e.g., audio and/or video data associated to location 28A and/or 28B) and/or an associated portion of an updated (i.e., current) portion of informational data (e.g., audio and/or video data in real time from database 12) describing associated location 28A and/or 28B. For example, a military user patrolling a battle field will carry tracking apparatus 25A and as the military user approaches each of locations 28A and 28B (e.g., a mountain, a landmark, a river, etc), tracking apparatus 25B will use GPS tracking data to detect each of locations 28A and 28B and broadcast an associated portion of informational data describing the locations 28A and 28B. Alternatively, tracking apparatus 25B will use GPS tracking data to detect each of locations 28A and 28B and perform a request to determine if updated (i.e., current) informational data associated with location 28A and/or 28B is available (e.g., in database 12) instead of or in addition to the informational data pre-stored on memory unit 15B. As an example, updated (i.e., current) informational data associated with location 28A may be required if location 28A comprises a river and the river is flooded. The military user may require updated informational data in order to avoid flooded sections of the river. If updated (i.e., current) informational data associated with locations 28A and/or 28B is located (i.e., available) then tracking apparatus 25B may store and/or broadcast the updated (i.e., current) informational data only or may broadcast a combination of the updated (i.e., current) informational data and the associated portion of informational data stored on memory unit 15B. The portion of the informational data or portion of the updated (i.e., current) informational data broadcasted for the user may be dependent on a specified distance that the user is from locations 28A and 28B, a speed of travel towards structure locations 28A and 28B, a direction that the user is facing with respect to locations 28A and 28B, an orientation that the user is facing with respect to the earth's magnetic poles. For example, if the user is moving quickly (e.g., user is driving a vehicle at a speed of about 40 mph) towards location 28A, the informational data and/or the updated (i.e., current) informational data broadcasted for the user may comprise a small abbreviated portion of the informational associated with location 28A as it is assumed that the user may not be within a viewing range of location 28A for very long. In contrast, if the user is moving slowly (e.g., user is walking) towards location 28A, the portion of the informational data or the updated (i.e., current) informational data broadcasted for the user may comprise an entire portion of the informational data associated with location 28A as it is assumed that the user will be within a viewing range of location 28A for a long enough time to receive the entire description for location 28A.

Tracking apparatus 25B comprises a controller 19, a memory unit 15A, a memory unit 15B, a GPS receiver 21, a compass 23, and an audio/video monitor 14. Controller 19 in combination with any controlling software on memory unit 15A controls all functionality of tracking apparatus 25B. Audio/video monitor 14 may comprise any type of audio and/or video monitor including, inter alia, an amplifier and speakers, a video monitor (LCD, Plasma, CRT, etc), or any combination thereof. Memory unit 15B comprises informational data describing each of locations 28A and 28B. Additionally, memory unit 15B comprises GPS trigger data describing a geographical location for locations 28A and 28B. The GPS trigger data describing location 28A is associated with the portion of the informational data or the updated (i.e., current) informational data describing location 28A. The GPS trigger data describing location 28B is associated with the portion of the informational data or the updated (i.e., current) informational data describing location 28B. Note that memory unit 15A and memory unit 15B may be part of a same memory unit or memory unit 15A and memory unit 15B may be individual discrete memory units. Memory unit 15A and memory unit 15B may comprise any type of memory unit (removable or non-removable) including, inter alia, non-volatile random access memory (RAM), flash memory (e.g., a USB jump drive), read only memory (ROM) (e.g., compact disc (CD) ROM, digital versatile disc (DVD) ROM, etc), hard disc drive etc.

When a user enables tracking apparatus 25B, tracking apparatus 25B continuously monitors GPS trigger data from GPS receiver 21 in order to locate locations 28A and 28B. As the user possessing (e.g., carrying) tracking apparatus 25B approaches location 28A, a GPS receiver 21 senses it's position with respect to location 28A, an associated portion of informational data stored on memory unit 15B is broadcast for the user via audio/video monitor 14. Alternatively, as the user possessing (e.g., carrying) tracking apparatus 25B approaches location 28A, tracking apparatus 25B may perform a request to determine if updated (i.e., current) informational data associated with location 28A is available (e.g., in database 12) instead of or in addition to the informational data stored on memory unit 15B. If updated (i.e., current) informational data associated with location 28A is located (i.e., available) then tracking apparatus 25B may store and/or broadcast (i.e., for the user) the updated (i.e., current) informational data only or may broadcast a combination of the updated (i.e., current) informational data and the associated portion of informational data stored on memory unit 15B. The updated (i.e., current) informational data or portion of the updated (i.e., current) informational data may be directly transmitted (i.e., in real time) from database 12 via wireless link 29C and broadcast for the user via audio/video monitor 14. A size of the associated portion of informational data stored on memory unit 15B and/or the updated (i.e., current) informational data from database 12 broadcasted for the user is dependent on a specified distance that the user is from location 28A, a speed of travel towards location 28A, a direction that the user is facing with respect to location 28A, or an orientation that the user is facing with respect to the earth's magnetic poles. The orientation that the user is facing with respect to the earth's magnetic poles is determined by compass 23. Each of the specified distances, speed of travel, and direction the user is facing with respect to location 28A is preprogrammed and associated with the associated portion of informational data stored on memory unit 15B and/or the updated (i.e., current) informational data from database 12 and associated with location 28A so that specified portions of the informational data may be broadcasted for the user. Likewise, as the user possessing (e.g., carrying) tracking apparatus 25B approaches location 28B, GPS receiver 21 senses it's position with respect to location 28B, an associated portion of informational data stored on memory unit 15B is broadcast for the user via audio/video monitor 14. Alternatively, as the user possessing (e.g., carrying) tracking apparatus 25B approaches location 28B, tracking apparatus 25B may perform a request to determine if updated (i.e., current) informational data associated with location 28B is available (e.g., in database 12) instead of or in addition to the informational data stored on memory unit 15B. If updated (i.e., current) informational data associated with location 28B is located (i.e., available) then tracking apparatus 25B may store and/or broadcast (i.e., for the user) the updated (i.e., current) informational data only or may broadcast a combination of the updated (i.e., current) informational data and the associated portion of informational data stored on memory unit 15B. The updated (i.e., current) informational data or portion of the updated (i.e., current) informational data may be directly transmitted (i.e., in real time) from database 12 via wireless link 29C and broadcast for the user via audio/video monitor 14. A size of the associated portion of informational data stored on memory unit 15B and/or the updated (i.e., current) informational data from database 12 broadcasted for the user is dependent on a specified distance that the user is from location 28B, a speed of travel towards location 28B, a direction that the user is facing with respect to location 28B, or an orientation that the user is facing with respect to the earth's magnetic poles. The orientation that the user is facing with respect to the earth's magnetic poles is determined by compass 23. Each of the specified distances, speed of travel, and direction the user is facing with respect to location 28B is preprogrammed and associated with the associated portion of informational data stored on memory unit 15B and/or the updated (i.e., current) informational data from database 12 and associated with location 28B so that specified portions of the informational data may be broadcasted for the user.

Figure 3:
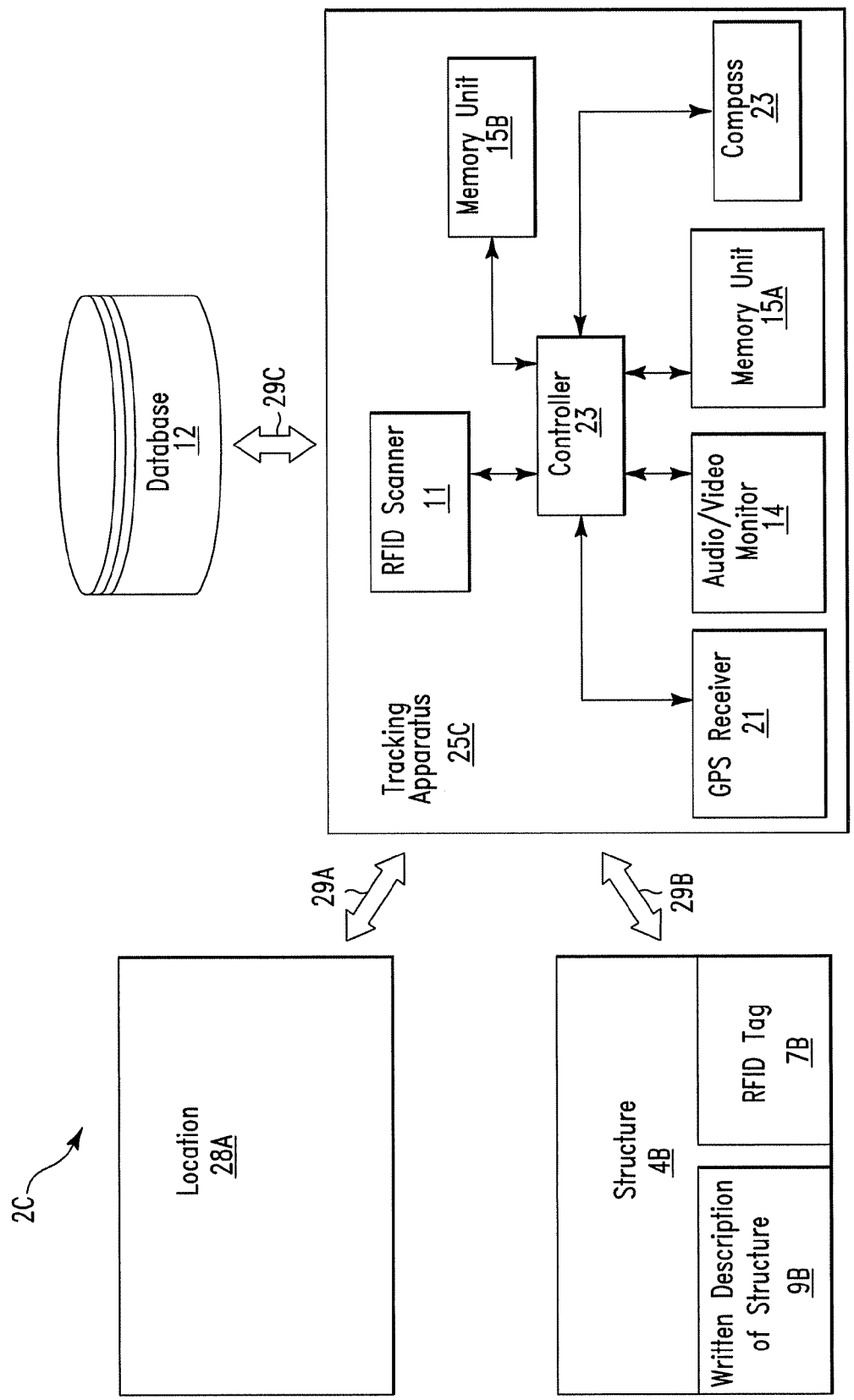
FIG. 3 illustrates a block diagram view of a system comprising an alternative tracking apparatus to the tracking apparatus of FIGS. 1 and 2, in accordance with embodiments of the present invention.

FIG. 3 illustrates a block diagram view of a system 2C comprising a tracking apparatus 25C, in accordance with embodiments of the present invention. Tracking apparatus 25C of FIG. 3 represents a combination of tracking apparatus 25A of FIG. 1 and 25B of FIG. 2. Tracking apparatus 25C comprises both a GPS receiver 21 and a RFID scanner 11. Tracking apparatus 25C enables a user to sense a GPS location for location 28A and broadcast an associated portion of informational data (i.e., pre-loaded in memory unit 15B and/or updated in real time from database 12) describing location 28A or sense RFID tag 7B for structure 4B and broadcast an associated portion of informational data (i.e., pre-loaded in memory unit 15B and/or updated in real time from database 12) describing structure 4B.

An example of implementation for tracking apparatus 25C is described as follows:

Using a military scenario, soldiers may require access to personally identifiable features and descriptions of specified targets (e.g., enemy soldiers, specific buildings, etc). The descriptions may be pre-stored descriptions and/or live updated descriptions. Tracking apparatus 25C may be integrated into a digital rifle scope, helmet-mounted night vision goggles, etc. In the example, an army patrol comprises an armored patrol vehicle and a dozen soldiers. The army patrol is given a designated area to patrol for a 12 hour mission. A mission commander (i.e., in a remote location) will have a specially outfitted computer system (e.g., database 12) with a satellite link (i.e., link 29C) access to a short range high speed network and long range low speed network. Before heading out on patrol, the soldiers (i.e., each using comprising a tracking apparatus 25C) will download via the high speed link updated informational data (i.e., from database 12) comprising information about the specified targets (e.g., enemy soldiers, specific buildings, etc) that are known or thought to be located in or around an area they expect to patrol on their upcoming mission. Once the pre-mission activities have been completed, (i.e., retrieving the informational data from database 12) they head out on patrol. The armored patrol vehicle that the solders will ride in or walk alongside has additionally been outfitted with access to the satellite link (link 29C). During the course of the patrol, new intelligence (i.e., updated informational data) may arrive that updates the last known whereabouts of the specified target. An intelligence gathering and processing team transmits the updated intelligence information from database 12 through a satellite. All computer systems (i.e., tracking apparatuses 25C) capable of receiving the satellite data link receive the updated intelligence information. The patrol vehicle will then filter out any data unrelated to their associated patrol and rebroadcast the updated informational data to the associated patrol team over the low speed or high speed networks, depending on how far each individual soldier has roamed from the patrol vehicle. As soldiers are on patrol, if they walk or ride near, into or towards an area that is relatively close to the last known whereabouts of the specified target, tracking apparatus 25C will signal an alert (e.g., a small red blinking light) to let the soldier know that the specified target is in range. Tracking apparatus 25C (e.g., located in a digital rifle scope, night vision goggles, etc) will display (i.e., using audio/video monitor 14) updated informational data related to the specified target located nearby and a last known whereabouts (i.e., pre-stored informational data) of the specified target relative to the soldier's current position. The updated informational data that is displayed (i.e., on audio/video monitor 14) may include recent photographs or vehicles that the specified target is known to use.

Figure 4:
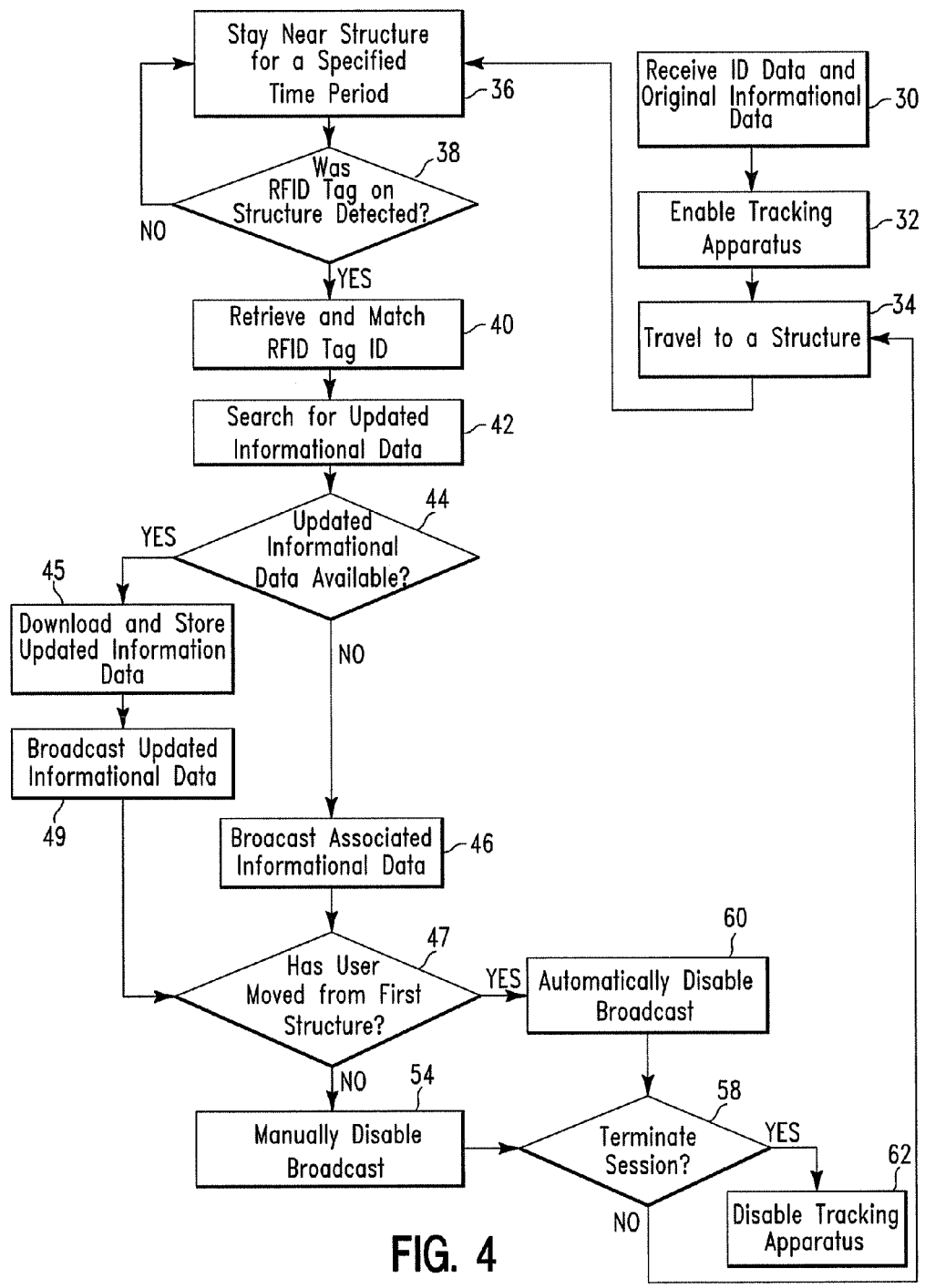
FIG. 4 is a flowchart illustrating an algorithm detailing an overall process used by the system of FIG. 1, in accordance with embodiments of the present invention.

FIG. 4 is a flowchart illustrating an algorithm detailing an overall process used by system 2A of FIG. 1, in accordance with embodiments of the present invention. In step 30, a user receives and stores (i.e., in memory unit 15B) identification data comprising RFID identifiers (i.e., serial numbers) for structures 4A and 4B and associated original informational data. RFID identifiers for structure 4A and 4B and associated original informational data may be, inter alia, downloaded from a website, downloaded from a database, etc. In step 32, tracking apparatus 25A is enabled. In step 34, the user travels to structure 4A. In step 36, the user stands nearby structure 4A. In step 38, it is determined if RFID tag 7A for structure 4A has been detected by tracking apparatus 25A. If in step 38 it is determined that RFID tag 7A for structure 4A has not been detected by tracking apparatus 25A, then step 36 is repeated. If in step 38, it is determined that RFID tag 7A for structure 4A has been detected by tracking apparatus 25A, then in step 40 an RFID tag number (e.g., a serial number) for RFID tag 7A is retrieved from memory unit 15B and matched to RFID tag 7A. In step 42, a search for any updated informational data is performed (e.g., search database 12). In step 44, it is determined if any updated informational data has been located. If in step 44, it is determined that updated informational data has not been located, then in step 46 an associated original informational data segment (i.e., associated with RFID tag 7A) is broadcast (i.e., via tracking apparatus 25A) for the user and the process continues to step 47. If in step 44, it is determined that updated informational data has been located (e.g., in database 12), then in step 45 the updated informational data is downloaded to tracking apparatus 25A and optionally stored in memory unit 15B. In step 49, a portion of the updated informational data is broadcast (i.e., via tracking apparatus 25A) for the user and the process continues to step 47.

In step 47, it is determined if the user has moved out of range from structure 4A.

If in step 47, it is determined that the user has moved out of range from structure 4A, then in step 60 the broadcast is automatically disabled and in step 58 the user is asked if the session (i.e., patrol of structures 4A and 4B) will be terminated. If in step 58, the user chooses to terminate the session, then in step 62 the tracking apparatus is disabled. If in step 58, the user chooses not to terminate the session, then step 34 is repeated to view another structure (e.g., structure 4B).

If in step 47, it is determined that the user has not moved out of range from structure 4A, then in step 54, the user may manually disable the broadcast. The user may temporarily disable the broadcast (e.g., pause the broadcast). Alternatively, the user may permanently disable the broadcast (e.g., stop the broadcast). If in step 58, the user chooses to terminate the session, then in step 62 the tracking apparatus is disabled. If in step 58, the user chooses not to terminate the session, then step 34 is repeated to view another structure (e.g., structure 4B).

Figure 5:
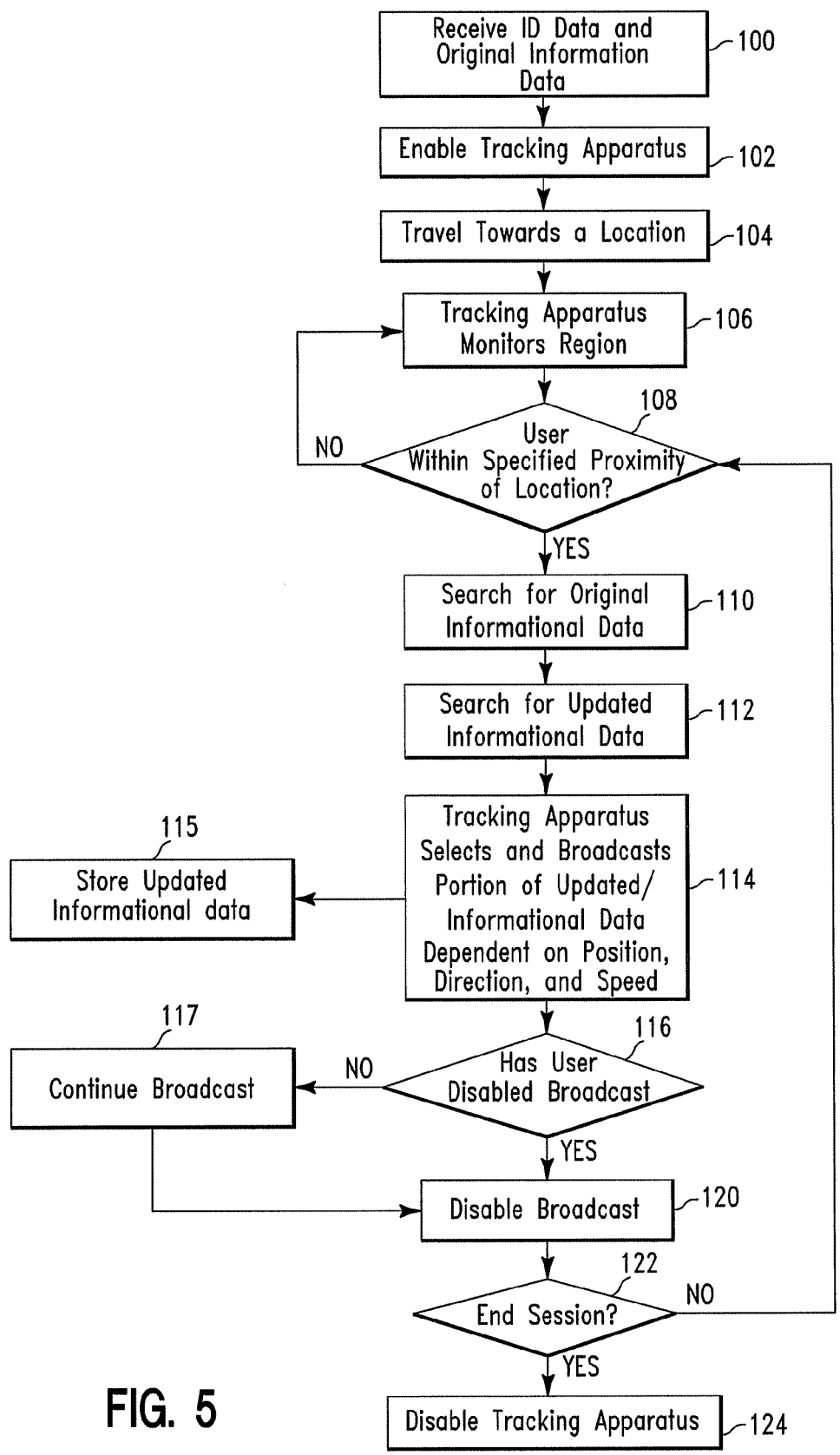
FIG. 5 is a flowchart illustrating an algorithm detailing an overall process used by the system of FIG. 2, in accordance with embodiments of the present invention.

FIG. 5 is a flowchart illustrating an algorithm detailing an overall process used by system 2B of FIG. 2, in accordance with embodiments of the present invention. In step 100, a user receives and stores (i.e., in memory unit 15B) identification data comprising GPS trigger data for locations 28A and 28B and associated original informational data comprising. GPS trigger data for locations 28A and 28B and associated original informational data may be, inter alia, downloaded from a website, downloaded from a database, etc. In step 102, tracking apparatus 25B is enabled. In step 104, the user travels to location 28A. In step 106, tracking apparatus 25B monitors its current position, speed, direction of travel, and/or orientation with respect to the earth and its poles as reported by GPS receiver 21 and compass 23. In step 108, it is determined if the user is within a specified proximity of location 28A. If in step 108, it is determined that the user is not within a specified proximity of location 28A then step 106 is repeated. If in step 108, it is determined that the user is within a specified proximity of location 28A, then in step 110 tracking apparatus 25B searches for an associated (i.e., with location 28A) original informational data segment (i.e., from memory unit 15B). In step 112, tracking apparatus 25B searches for an associated (i.e., with location 28A) updated (i.e., with respect to the original informational data segment) informational data segment (i.e., from database 12). In step 114, tracking apparatus 25B selects and broadcasts a portion of the original informational data segment and/or a portion of the updated informational data segment. A size of the portion the original informational data segment and/or portion of the updated informational data segment is dependent on a position, direction, and speed of travel of the user with respect to location 28A. Alternatively, in step 114 tracking apparatus 25B may select and broadcast a portion of an original informational data segment and/or a portion of an updated informational data segment for a location (not shown) that the user is orientated towards. An orientation for the user is determined by compass 23 with respect to the earth's magnetic poles. In step 115, the user may optionally store an updated informational data segment in memory unit 15B. In step 116, it is determined if the user has disabled the broadcast. The user may temporarily disable the broadcast (e.g., pause the broadcast). Alternatively, the user may permanently disable the broadcast (e.g., stop the broadcast).

If in step 116, it is determined that the user has not disabled the broadcast, then in step 117 tracking device 25B continues the broadcast until the user disables the broadcast in step 120. Alternatively, if the user moves away from location 28A, tracking apparatus 25B may automatically disable the broadcast in step 120. In step 122 the user determines if the session should end. If in step 122, the user determines that the session should not end, then step 108 is repeated. If in step 122, the user determines that the session should end, then in step 124, tracking apparatus 25B is disabled.

If in step 116, it is determined that the user has disabled the broadcast, then in step 120 the broadcast is disabled. In step 122, the user determines if the session should end. If in step 122, the user determines that the session should not end, then step 108 is repeated. If in step 122, the user determines that the session should end, then in step 124, tracking apparatus 25B is disabled.

Figure 6:
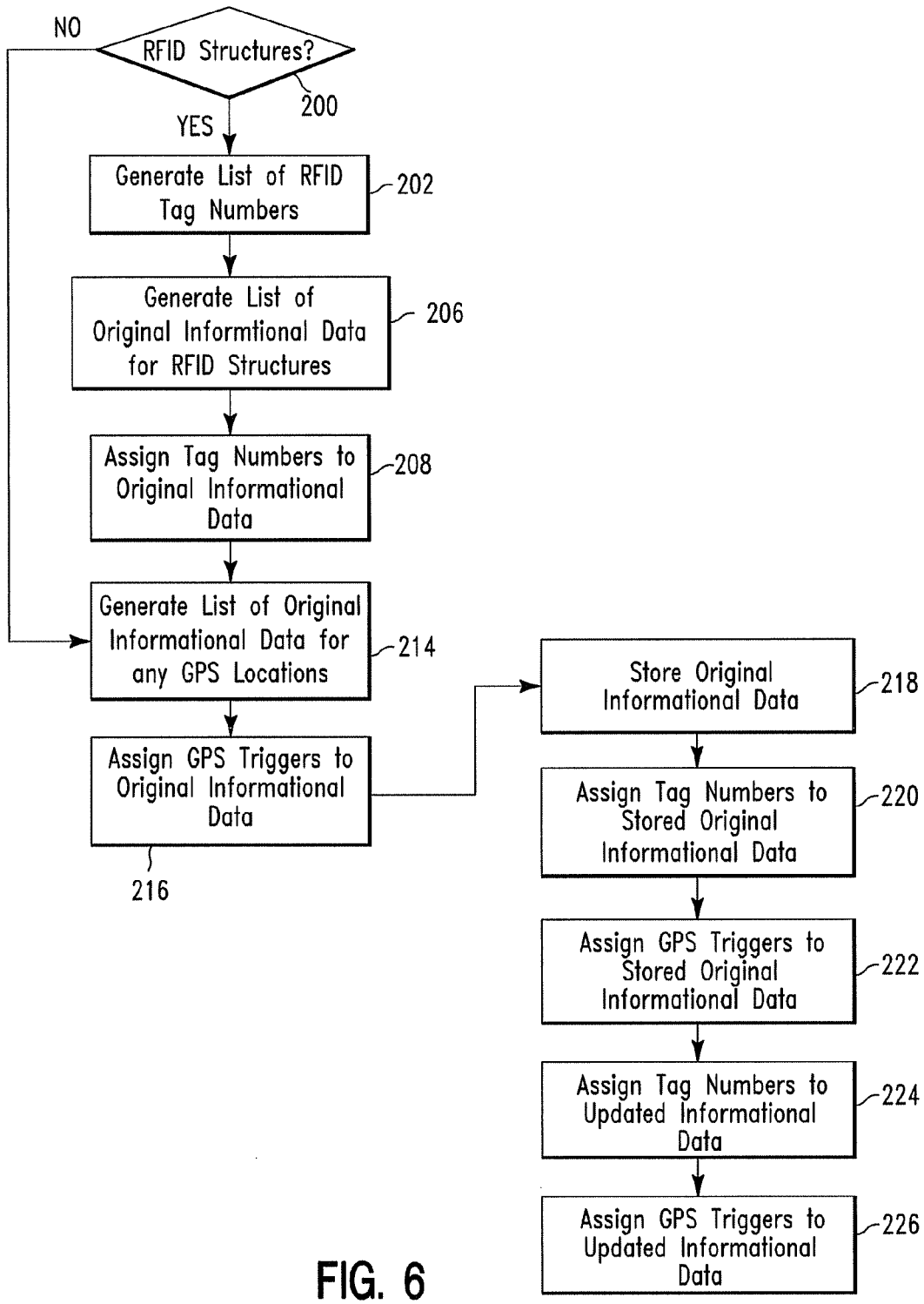
FIG. 6 is a flowchart illustrating an algorithm detailing an overall process for associating structures and locations with original and updated informational data, in accordance with embodiments of the present invention.

FIG. 6 is a flowchart illustrating an algorithm detailing an overall process for associating structures and locations with original and updated informational data, in accordance with embodiments of the present invention. The overall process described in the flowchart of FIG. 6 is described with reference to FIGS. 1 and 2. In step 200, it is determined if any RFID structures (e.g., structures 4A and 4B) require descriptions. If in step 200, it is determined that there are no RFID structures (e.g., structures 4A and 4B) that require descriptions, then step 214 is performed as described, infra. If in step 200, it is determined there are RFID structures (e.g., structures 4A and 4B) that require descriptions then in step 202, a list of RFID tag numbers (e.g., serial numbers for RFID tags 7A and 7B) is generated. In step 206, a list of original informational data for the RFID structures (e.g., for structures 4A and 4B) is generated. In step 208, the RFID tag numbers from the list generated in step 202 are assigned to associated original informational data from the list generated in step 206. In step 214, a list of original informational data for the GPS locations (e.g., for locations 28A and 28B) is generated. In step 216, the original informational data for each GPS location are assigned associated GPS trigger data. In step 218, all original informational data from the lists generated in steps 206 and 214 is retrieved and stored. In step 220, the RFID tag numbers from step 202 are assigned to associated stored original informational data. In step 222, the GPS trigger data from step 216 is assigned to associated stored original informational data. In step 224, the RFID tag numbers from step 202 are assigned to associated updated informational data. In step 226, the GPS trigger data from step 216 is assigned to associated updated informational data.

Figure 7:
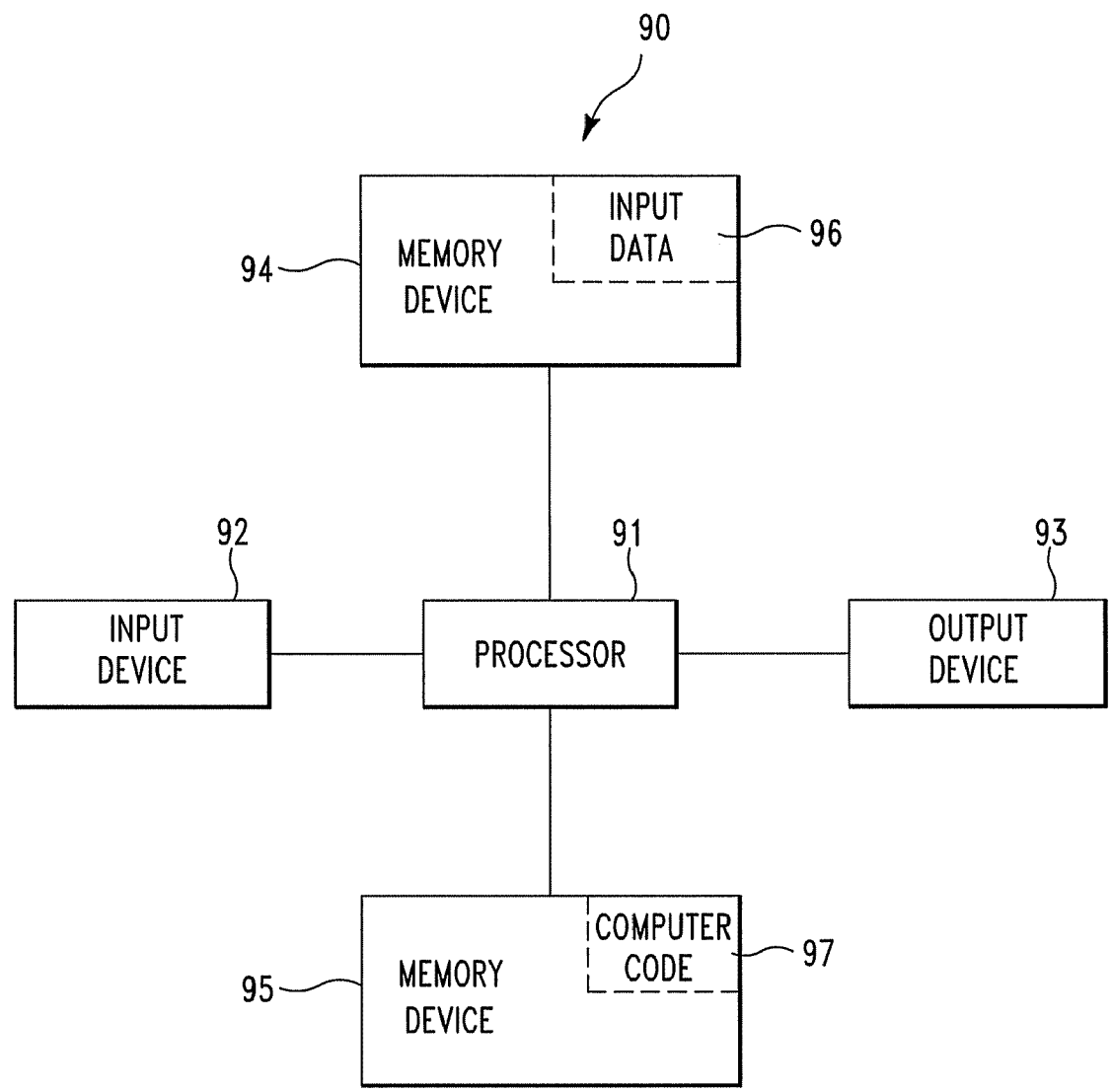
FIG. 7 illustrates a computer system used for implementing the tracking apparatuses of FIGS. 1-3, in accordance with embodiments of the present invention.

FIG. 7 illustrates a computer system 90 used for implementing tracking apparatuses 25A . . . 25C of FIGS. 1-3, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital versatile disc (DVD), a dynamic random access memory (DRAM), a read-only memory (ROM), etc. The memory device 95 includes a computer code 97. The computer code 97 includes an algorithm for implementing the processes of FIGS. 4 and 5. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may comprise the algorithms of FIGS. 4 and 5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to broadcast updated informational data. Thus the present invention discloses a process for deploying or integrating computing infrastructure, comprising integrating computer-readable code into the computer system 90, wherein the code in combination with the computer system 90 is capable of performing a method for broadcasting updated informational data. In another embodiment, the invention provides a business method that performs the process steps of the invention on a subscription, advertising, and/or fee basis. That is, a service provider, such as a Solution Integrator, could offer to broadcast updated informational data. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
  receiving, by a tracking apparatus, data, said data comprising informational data segments and associated tracking data segments, said informational data segments and said associated tracking data segments associated with a plurality of locations, each informational data segment of said informational data segments and each associated tracking data segment of said tracking data segments associated with a different location from said plurality of locations, each said location at a different geographical area, said tracking apparatus comprising a memory device;
  storing, said data within said memory device;
  sensing, by said tracking apparatus, a first location of said locations, wherein said tracking apparatus is located within a specified proximity of said first location of said locations;
  first retrieving, by said tracking apparatus, a first informational data segment of said informational data segments associated with said first location, said first retrieving based on a first tracking data segment of said associated tracking data segments associated with said first informational data segment;

requesting, by said tracking apparatus, an updated informational data segment, said updated informational data segment associated with said first informational data segment, said first tracking data segment, and said first location;

second retrieving, by said tracking apparatus, said updated informational data segment; and broadcasting, by said tracking apparatus, a specified portion of said updated informational data segment, said specified portion of said updated informational data segment dependent on a specified condition of said tracking apparatus.

2. The method of claim 1, further comprising:

broadcasting, by said tracking apparatus, a specified portion of said first informational data segment, said specified portion of said first informational data segment dependent on said specified condition of said tracking apparatus.

3. The method of claim 1, wherein said tracking apparatus comprises a global positioning satellite (GPS) receiver, wherein said first associated tracking data segment comprises a first GPS data segment associated with said specified condition, wherein said sensing comprises retrieving a GPS location for said first location, and wherein said method further comprises:

matching, by said tracking apparatus, said first GPS data segment with said specified condition.

4. The method of claim 3, wherein said tracking apparatus further comprises a digital compass, wherein said tracking apparatus is pivoted towards a second location, and wherein said method further comprises:

retrieving, by said tracking apparatus, a second informational data segment of said informational data segments associated with said second location, said retrieving said second informational data segment based on orientation data supplied by said digital compass and said GPS location; and broadcasting, by said tracking apparatus, a specified portion of said second informational data segment.

5. The method of claim 3, wherein said specified condition comprises a condition selected from the group consisting of a direction of said tracking apparatus with respect to said first location, a distance that said tracking apparatus is from said first location, and a speed of said moving.

6. The method of claim 1, wherein said tracking apparatus comprises a radio frequency identification (RFID) tag reader, wherein said first location comprises a first structure, wherein said first structure comprises a first RFID tag, wherein said first tracking data segment comprises information related to said RFID tag, and wherein said method further comprises:

matching, by said tracking apparatus, said information with said first RFID tag.

7. The method of claim 6, wherein said information comprises a serial number for said first RFID tag.

8. The method of claim 1, wherein said specified condition comprises a specified amount of time that said tracking apparatus is located within said specified proximity of said first location.

9. The method of claim 1, wherein said memory device is comprises a non-volatile random access memory (RAM) device, and wherein said method further comprises:

storing, said updated informational data segment within said memory device.

10. The method of claim 1, wherein said first informational data segment and said updated informational data segment each comprise video data describing said first location.

11. The method of claim 1, wherein said specified portion of said updated informational data segment does not comprise an entire portion of said updated informational data segment.

12. The method of claim 1, wherein said requesting and said second retrieving are each performed using a wireless network.

13. A tracking apparatus comprising a processor coupled to a computer-readable memory unit, said memory unit comprising data and instructions that when executed by the processor implement a tracking method, said method comprising;

receiving, by said tracking apparatus, data, said data comprising informational data segments and associated tracking data segments, said informational data segments and said associated tracking data segments associated with a plurality of locations, each informational data segment of said informational data segments and each associated tracking data segment of said tracking data segments associated with a different location from said plurality of locations, each said location at a different geographical area, said tracking apparatus comprising a memory device;

storing, said data within said memory unit;

sensing, by said tracking apparatus, a first location of said locations, wherein said tracking apparatus is located within a specified proximity of said first location of said locations;

first retrieving, by said tracking apparatus, a first informational data segment of said informational data segments associated with said first location, said first retrieving based on a first tracking data segment of said associated tracking data segments associated with said first informational data segment;

requesting, by said tracking apparatus, an updated informational data segment, said updated informational data segment associated with said first informational data segment, said first tracking data segment, and said first location;

second retrieving, by said tracking apparatus, said updated informational data segment; and broadcasting, by said tracking apparatus, a specified portion of said updated informational data segment, said specified portion of said updated informational data segment dependent on a specified condition of said tracking apparatus.

14. The apparatus of claim 13, wherein the method further comprises:

broadcasting, by said tracking apparatus, a specified portion of said first informational data segment, said specified portion of said first informational data segment dependent on said specified condition of said tracking apparatus.

15. The apparatus of claim 13, wherein said tracking apparatus comprises a global positioning satellite (GPS) receiver, wherein said first associated tracking data segment comprises a first GPS data segment associated with said specified condition, wherein said sensing comprises retrieving a GPS location for said first location, and wherein said method further comprises:

matching, by said tracking apparatus, said first GPS data segment with said specified condition.

16. The apparatus of claim 15, wherein said tracking apparatus further comprises a digital compass, wherein said tracking apparatus is pivoted towards a second location, and wherein said method further comprises:

retrieving, by said tracking apparatus, a second informational data segment of said informational data segments associated with said second location, said retrieving said second informational data segment based on orientation data supplied by said digital compass and said GPS location; and broadcasting, by said tracking apparatus, a specified portion of said second informational data segment.

17. The apparatus of claim 15, wherein said specified condition comprises a condition selected from the group consisting of a direction of said tracking apparatus with respect to said first location, a distance that said tracking apparatus is from said first location, and a speed of said moving.

18. The apparatus of claim 13, wherein said tracking apparatus comprises a radio frequency identification (RFID) tag reader, wherein said first location comprises a first structure, wherein said first structure comprises a first RFID tag, wherein said first tracking data segment comprises information related to said RFID tag, and wherein said method further comprises:

matching, by said tracking apparatus, said information with said first RFID tag.

19. The apparatus of claim 18, wherein said information comprises a serial number for said first RFID tag.

20. The apparatus of claim 13, wherein said specified condition comprises a specified amount of time that said tracking apparatus is located within said specified proximity of said first location.

21. The apparatus of claim 13, wherein said memory device is comprises a non-volatile random access memory (RAM) device, and wherein said method further comprises:

storing, said updated informational data segment within said memory device.

22. The apparatus of claim 13, wherein said first informational data segment and said updated informational data segment each comprise video data describing said first location.

23. The apparatus of claim 13, wherein said specified portion of said updated informational data segment does not comprise an entire portion of said updated informational data segment.

24. The apparatus of claim 13, wherein said requesting and said second retrieving are each performed using a wireless network.

25. A computer program product, comprising a computer usable medium comprising a computer readable program code embodied therein, said computer readable program code comprising an algorithm adapted to implement a tracking method within a tracking apparatus comprising a memory unit, said method comprising:

receiving, by said tracking apparatus, data, said data comprising informational data segments and associated tracking data segments, said informational data segments and said associated tracking data segments associated with a plurality of locations, each informational data segment of said informational data segments and each associated tracking data segment of said tracking data segments associated with a different location from said plurality of locations, each said location at a different geographical area, said tracking apparatus comprising a memory device;

storing, said data within said memory unit;

sensing, by said tracking apparatus, a first location of said locations, wherein said tracking apparatus is located within a specified proximity of said first location of said locations;

sensing, by said tracking apparatus, said first location of said locations;

first retrieving, by said tracking apparatus, a first informational data segment of said informational data segments associated with said first location, said first retrieving based on a first tracking data segment of said associated tracking data segments associated with said first informational data segment;

requesting, by said tracking apparatus, an updated informational data segment, said updated informational data segment associated with said first informational data segment, said first tracking data segment, and said first location;

second retrieving, by said tracking apparatus, said updated informational data segment; and broadcasting, by said tracking apparatus, a specified portion of said updated informational data segment, said specified portion of said updated informational data segment dependent on a specified condition of said tracking apparatus.

26. The computer program product of claim 25, wherein the method further comprises:

broadcasting, by said tracking apparatus, a specified portion of said first informational data segment, said specified portion of said first informational data segment dependent on said specified condition of said tracking apparatus.

27. The computer program product of claim 25, wherein said tracking apparatus comprises a global positioning satellite (GPS) receiver, wherein said first associated tracking data segment comprises a first GPS data segment associated with said specified condition, wherein said sensing comprises retrieving a GPS location for said first location, and wherein said method further comprises:

matching, by said tracking apparatus, said first GPS data segment with said specified condition.

28. The computer program product of claim 27, wherein said tracking apparatus further comprises a digital compass, wherein said tracking apparatus is pivoted towards a second location, and wherein said method further comprises:

retrieving, by said tracking apparatus, a second informational data segment of said informational data segments associated with said second location, said retrieving said second informational data segment based on orientation data supplied by said digital compass and said GPS location; and broadcasting, by said tracking apparatus, a specified portion of said second informational data segment.

29. The computer program product of claim 27, wherein said specified condition comprises a condition selected from the group consisting of a direction of said tracking apparatus with respect to said first location, a distance that said tracking apparatus is from said first location, and a speed of said moving.

30. The computer program product of claim 25, wherein said tracking apparatus comprises a radio frequency identification (RFID) tag reader, wherein said first location comprises a first structure, wherein said first structure comprises a first RFID tag, wherein said first tracking data segment comprises information related to said RFID tag, and wherein said method further comprises:

matching, by said tracking apparatus, said information with said first RFID tag.

31. The computer program product of claim 30, wherein said information comprises a serial number for said first RFID tag.

32. The computer program product of claim 25, wherein said specified condition comprises a specified amount of time that said tracking apparatus is located within said specified proximity of said first location.

33. The computer program product of claim 25, wherein said memory device is comprises a non-volatile random access memory (RAM) device, and wherein said method further comprises:
  storing, said updated informational data segment within said memory device.

34. The computer program product of claim 25, wherein said first informational data segment and said updated informational data segment each comprise video data describing said first location.

35. The computer program product of claim 25, wherein said specified portion of said updated informational data segment does not comprise an entire portion of said updated informational data segment.

36. The computer program product of claim 25, wherein said requesting and said second retrieving are each performed using a wireless network.

37. A process for integrating computing infrastructure, comprising integrating computer-readable code into a tracking apparatus, wherein the code in combination with the tracking apparatus is capable of performing a tracking method, said method comprising:
  receiving, by said tracking apparatus, data, said data comprising informational data segments and associated tracking data segments, said informational data segments and said associated tracking data segments associated with a plurality of locations, each informational data segment of said informational data segments and each associated tracking data segment of said tracking data segments associated with a different location from said plurality of locations, each said location at a different geographical area, said tracking apparatus comprising a memory device;
  storing, said data within a memory unit within said tracking apparatus;
  sensing, by said tracking apparatus, a first location of said locations, wherein said tracking apparatus is located within a specified proximity of said first location of said locations;
  first retrieving, by said tracking apparatus, a first informational data segment of said informational data segments associated with said first location, said first retrieving based on a first tracking data segment of said associated tracking data segments associated with said first informational data segment;
  requesting, by said tracking apparatus, an updated informational data segment, said updated informational data segment associated with said first informational data segment, said first tracking data segment, and said first location;
  second retrieving, by said tracking apparatus, said updated informational data segment; and
  broadcasting, by said tracking apparatus, a specified portion of said updated informational data segment, said specified portion of said updated informational data segment dependent on a specified condition of said tracking apparatus.

38. The process of claim 37, wherein the method further comprises:
  broadcasting, by said tracking apparatus, a specified portion of said first informational data segment, said specified portion of said first informational data segment dependent on said specified condition of said tracking apparatus.

39. The process of claim 37, wherein said tracking apparatus comprises a global positioning satellite (GPS) receiver, wherein said first associated tracking data segment comprises a first GPS data segment associated with said specified condition, wherein said sensing comprises retrieving a GPS location for said first location, and wherein said method further comprises:
  matching, by said tracking apparatus, said first GPS data segment with said specified condition.

40. The process of claim 39, wherein said tracking apparatus further comprises a digital compass, wherein said tracking apparatus is pivoted towards a second location, and wherein said method further comprises:
  retrieving, by said tracking apparatus, a second informational data segment of said informational data segments associated with said second location, said retrieving said second informational data segment based on orientation data supplied by said digital compass and said GPS location; and
  broadcasting, by said tracking apparatus, a specified portion of said second informational data segment.

41. The process of claim 39, wherein said specified condition comprises a condition selected from the group consisting of a direction of said tracking apparatus with respect to said first location, a distance that said tracking apparatus is from said first location, and a speed of said moving.

42. The process of claim 37, wherein said tracking apparatus comprises a radio frequency identification (RFID) tag reader, wherein said first location comprises a first structure, wherein said first structure comprises a first RFID tag, wherein said first tracking data segment comprises information related to said RFID tag, and wherein said method further comprises:
  matching, by said tracking apparatus, said information with said first RFID tag.

43. The process of claim 42, wherein said information comprises a serial number for said first RFID tag.

44. The process of claim 37, wherein said specified condition comprises a specified amount of time that said tracking apparatus is located within said specified proximity of said first location.

45. The process of claim 37, wherein said memory device is comprises a non-volatile random access memory (RAM) device, and wherein said method further comprises:
  storing, said updated informational data segment within said memory device.

46. The process of claim 37, wherein said first informational data segment and said updated informational data segment each comprise video data describing said first location.

47. The process of claim 37, wherein said specified portion of said updated informational data segment does not comprise an entire portion of said updated informational data segment.

48. The process of claim 37, wherein said requesting and said second retrieving are each performed using a wireless network.

* * * * *